United States Patent
Lewis

[15] 3,696,726
[45] Oct. 10, 1972

[54] SHUTTER OPERATING SYSTEM
[72] Inventor: Donald E. Lewis, Canandaigua, N.Y.
[73] Assignee: Ilex Optical Company, Inc., Rochester, N.Y.
[22] Filed: Jan. 21, 1969
[21] Appl. No.: 792,561

[52] U.S. Cl..............................95/53 EA, 95/10 CT
[51] Int. Cl............................G03b 7/02, G03b 9/62
[58] Field of Search..........95/53, 10 C; 317/141, 142

[56] References Cited

UNITED STATES PATENTS

| | | | |
|---|---|---|---|
| 3,257,919 | 6/1966 | Sato et al. | 95/10 C |
| 3,512,048 | 5/1970 | Wallentowitz et al. | 317/142 |
| 3,407,716 | 10/1968 | Wick et al. | 95/10 C |
| 3,427,941 | 2/1969 | Metzger | 95/10 C |
| 3,512,000 | 5/1970 | Powell | 95/10 C |
| 3,348,462 | 10/1967 | Fahlenberg | 95/53 |
| 3,434,403 | 3/1969 | Biedermann et al. | 95/10 C |
| 3,461,351 | 8/1969 | Heaslip et al. | 317/142 |
| 3,511,157 | 5/1970 | Eloranta | 95/53 E |

Primary Examiner—Samuel S. Matthews
Assistant Examiner—Russell E. Adams, Jr.
Attorney—George W. Shaw and Eugene S. Stephens

[57] ABSTRACT

A solenoid-actuated camera shutter is timed by an SCR multivibrator. For relatively-short exposure times, the multivibrator is operated monostably, and exposure time is selected by adjusting the time constant of the monostable mode. Bistable multivibrator operation provides for exposure time selection independent of the multivibrator.

17 Claims, 3 Drawing Figures

Donald E. Lewis
INVENTOR.

SHUTTER OPERATING SYSTEM

BACKGROUND OF THE INVENTION

This invention relates to systems for electrical operation of camera shutters. Various motor devices have been used heretofore to operate camera shutters: solenoids, spring devices, and the like, in combination with various forms of electrical circuitry for controlling the motor, as by energizing a solenoid, releasing a cocked spring, and so on. The systems heretofore proposed have not been notable for simplicity, ruggedness and reliability.

SUMMARY OF THE INVENTION

According to the present invention, exposure is initiated by energizing a solenoid, the magnetic force of which drives a shutter away from an aperture. The aperture forms part of a camera or equivalent device, in which a photosensitive element is exposed to light, via the aperture, for photographic or like purposes. In the present invention, the shutter is a simple mechanical device having a spring normally forcing the shutter to maintain a position covering the aperture to prevent light from passing then through. The magnetic force of the solenoid overcomes the spring force, and keeps the shutter open as long as it is maintained. The exposure is ended by de-energizing the solenoid, upon which the spring drives the shutter back to its original position.

In the present invention, the exposure is timed by a monostable multivibrator including a pair of SCR's(silicon controlled rectifiers). One SCR fires only when the multivibrator is stable, and the other fires only when the multivibrator is metastable. The solenoid is in the anode-cathode circuit of the latter SCR, so it is energized only when the multivibrator is in its metastable state. The length of time the multivibrator can stay metastable is determined by its internal circuitry, so exposure time is controlled by adjusting this circuitry.

In the present invention, the monostable action of the multivibrator can be disabled, as by modifying its internal circuitry, or otherwise, thereby allowing exposure time to be determined independently of the multivibrator.

The foregoing features and others are described more fully hereinbelow and pointed out in the claims appended hereto.

IN THE DRAWINGS

Figure 1:
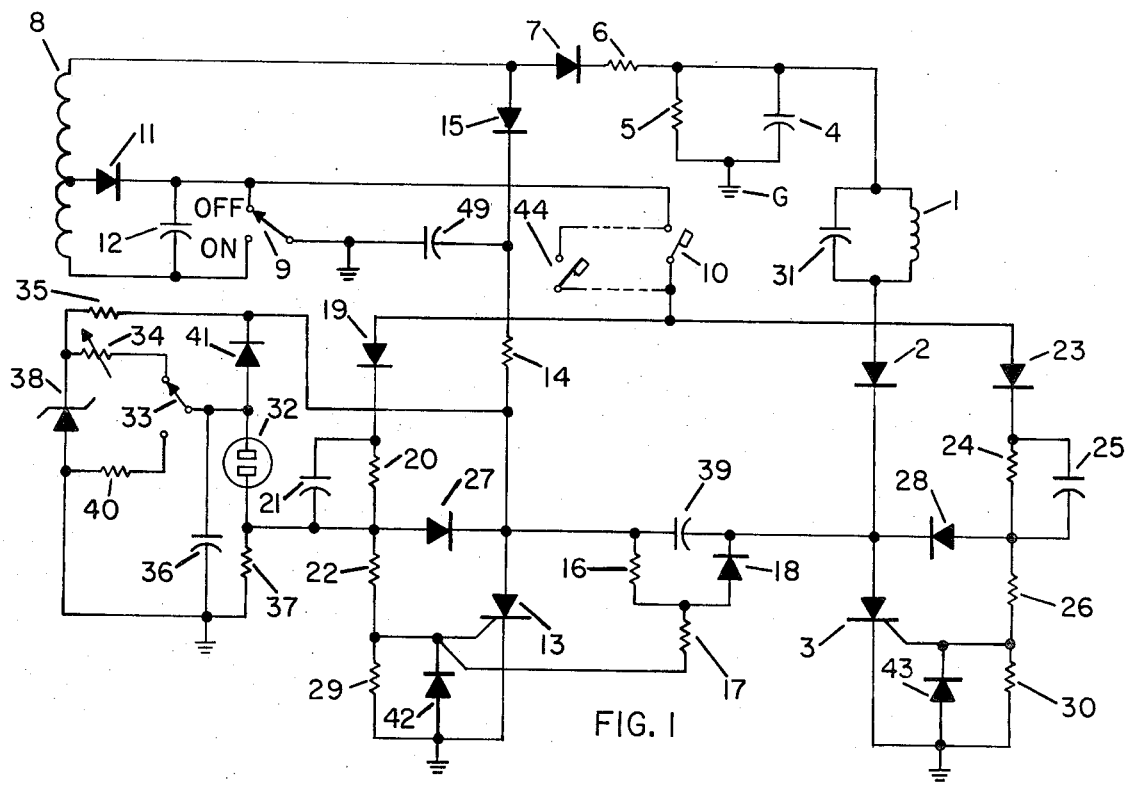
FIG. 1 is a detailed diagram of the electrical circuitry of a camera shutter operating system according to the invention.

In FIG. 1, coil 1 represents the winding of a solenoid for driving a shutter mechanism (not shown in FIG. 1). Coil 1 is connected by one end via a diode 2 to the anode of an SCR 3. The other end of the coil is connected to the common junction of a capacitor 4, a resistor 5, and a resistor 6. Resistor 5 and capacitor 4 connect to ground or circuit common, as indicated at G, and the anode of diode 7 connects to one end of the secondary winding 8 of a transformer(not shown), intended to be energized by house current or other suitable AC source. The other end of winding 8 is intended to be connected to ground via a switch 9, shown in its "off" position. That is, the lower end of winding 8 is disconnected from ground. Although a tap on winding 8 is shown connected to the anode of a diode 11 the cathode of which is grounded when switch 9 is off, nevertheless since the anode of diode 7 is connected to the upper end of winding 8, no voltage can develop across capacitor 4, at this time.

If switch 9 is thrown to its "on" position, winding 8, diode 7, resistors 5 and 6, and capacitor 4 form a half-wave rectified D.C. supply. Resistor 5 deregulates the supply. Thus constituted, the D.C. supply provides for safety, low power consumption, and overdriving the coil 1. Preferably, the coil 1 is initially energized by a relatively high voltage, too high for sustained application to the coil without risk of burning it out, but assuring positive, fast buildup of coil current. Deregulation causes the initial voltage to drop off very quickly after energizing the coil. The amount of deregulation is chosen to be such that it does not drop coil current to a value insufficient to hold the shutter open. The coil 1, of course, is rated to handle the level of current obtaining in it during the deregulated condition for an indefinite length of time.

Coil current does not flow unless SCR 3 fires and completes the circuit from the cathode of diode 7 to the ground to which the cathode of SCR 3 is depicted to be connected, in FIG. 1. As will be explained in more detail later, SCR 3 is fired by a pulse applied to its gate, which pulse originates at a momentary actuation switch 10, which connects a half-wave rectified voltage from diode 11, filtered by a capacitor 12, to the gate of SCR 3. Switch 9, of course, has to be in its "on" position, in order for switch 10 to be able to provide a pulse.

A second SCR 13 has its anode connected via resistor 14 to the cathode of a diode 15. Diode 15, like diode 7, has its anode connected to the upper end of winding 8, and like SCR 3, SCR 13 has its cathode connected to system ground, as shown.

The two SCR's are interconnected by a commutating capacitor 39, to obtain the basic multivibrator action, in which, if one SCR is firing, then firing the other SCR will turn said one SCR off, so that if said one SCR is then fired again the said other will turn off, and so on.

Assuming winding 8 is energized by suitable AC, then throwing switch 9 to its on position, should fire SCR 13. In the circuit of FIG. 1, this is assured by a safety circuit, essentially resistors 16 and 17 connected in series between the anode of SCR 13 and its gate, and a diode 18, connecting the junction of resistors 16 and 17 to the anode of SCR 3. Throwing the switch 9 means that the gate of SCR 13 is pulsed through resistors 16 and 17; so SCR 13 turns on. SCR 3, so far, cannot turn on, unless switch 10 is now momentarily closed, for turning SCR 13 on assures that SCR 3 will turn on when switch 10 is actuated. If neither SCR turned on, upon energization of winding 8, the first actuation of switch 10 might just turn SCR 13 on, or might even turn both SCR's on at the same time. The former of these events is undesirable because it will make it uncertain whether the shutter will operate or not, when the switch 10 is actuated. In the second case, both SCR's firing at once makes the circuit inoperative, making it necessary to disconnect the AC power momentarily to stop SCR firing, and then to reconnect the power, hoping that now only one SCR would fire.

Once SCR 13 is on, however, resistor 16 is at ground potential and hence resistors 16 and 17 cannot apply any voltage to the gate of SCR 13. At the same time, if SCR 3 now is turned on by pulsing its gate, resistors 16 and 17 are grounded through diode 18 and SCR 3, so again no voltage can be supplied by the resistors to the gate of SCR 13.

In summary, therefore, throwing switch 9 to on, fires SCR 13. Hence, to operate the shutter it is necessary to fire SCR 3. To do this, switch 10 is closed, momentarily, whereby DC from diode 15 is applied to the SCR gates, the one via a diode 19, a resistor 20 and capacitor 21 in parallel, and a resistor 22, the other via a diode 23, a resistor 24 and a capacitor 25 in parallel, and a resistor 26. Diodes 19 and 23 isolate the respective gate circuits from one another, and the paralleled resistors and capacitors define the actual gate pulse. That is to say, the switch 10, normally a finger operated push button switch, can be operated overly long. Thus, if the gate pulse lasts longer than the turn-off times of the SCR's, both SCR's would be forced to fire, and would continue to do so until the power was removed. In the present case, the capacitances of capacitors 21 and 25 are chosen to limit duration of the pulses applied to the SCR gates to a length less than SCR turnoff time. The resistors 20 and 24, further, discharge their respective capacitors 21 and 25, once the switch 10 is allowed to open, so that the capacitors are prepared to pass the next pulse from switch 10. Resistors 20 and 24 are also chosen to have high enough resistance so that they themselves cannot create gate voltage on the SCR gates, high enough to fire the SCR's.

Diodes 27 and 28 effectively short to ground capacitors 21 and 25, depending on which SCR is firing. Thus, if SCR 13 is firing, capacitor 21 is grounded through it, thereby preventing any buildup of voltage on the gate of SCR 13 as a result of switch 10 firing SCR 3. Further, an SCR turning off creates a negative going pulse at its anode which is impressed on its gate via that one of diode 27 and 28 connecting its anode to its gate via the corresponding one of resistors 22 and 26.

The level of gate pulses is controlled by resistors 22, 26, 29, and 30. Resistors 29 and 30 connect the gates of SCR's 13 and 3, respectively to ground, forming voltage dividers with resistors 22 and 26, respectively, with respect to the pulses delivered by capacitors 21 and 25, respectively. Capacitor 4 and resistance 5 are chosen to prevent "rate effect" from firing SCR 3 upon energization of winding 8 initially.

In sum, then, when switch 9 is thrown "on", SCR 13 turns on. Then, when switch 10 is closed for an indefinite time interval, the gate of SCR 3 receives a pulse of just the appropriate duration and level to turn SCR 3 on. When this happens, capacitor 39 turns SCR 13 off. Thus, when SCR 13 was on, the side of capacitor 39 connected to the anode of SCR 13 was effectively connected to ground via the firing SCR. The other side of the capacitor 39, however, was isolated from ground by SCR 3, which was then off(also, the diode 18 and 28 have their cathodes connected to the positive voltage applied to the anode of SCR 3 via coil 1 and diode 2) so the said other side of capacitor 39 is charged up to the peak value of the voltage at the junction of resistors 5 and 6.

Now, however, if SCR 3 is turned on, the said other side of capacitor 39 is connected to ground via SCR 3, thereby making the previously-grounded side of capacitor 39 about as negative with respect to ground, as the said other side had been positive with respect thereto, before SCR 3 fired. That is, the side of capacitor 39 connected to the anode of SCR 13 becomes negative and the charge in the capacitor defeats the positive voltage on the anode of SCR 13. In effect, SCR 13 is disconnected from its anode supply, and therefore turns off.

When SCR 3 fires, the relatively high voltage on capacitor 4 discharges through coil 1, creating an intense magnetic force that in effect snaps the shutter open in an instant of time that is small as compared to the time it is to remain open. The voltage quickly drops off to a point where just sufficient current flows through the coil as will create sufficient magnetic force to hold the shutter open in spite of the spring attempting to close the shutter. As energization and deenergization of the coil 1 create transients, diode 2, and a capacitor 31 connected across coil 1 are provided to protect SCR 3 from these transients.

At this point, it will be observed that the shutter could be closed by actuating switch 10 again. Thus, if SCR 13 is now caused to fire, the capacitor 39 will turn SCR 3 off, as described before in the case of turning SCR 13 off, when SCR 3 turned on. Turning off SCR 3 will cause current to cease flowing through coil 1, so the shutter spring, now unopposed by magnetic force, will in effect snap the shutter closed in an instant of time that is small with respect to the desired exposure time. This, as it happens, is one desired mode of controlling exposure time, as for example, where the exposure time is measured in minutes or even larger units. Thus, a human operator could operate switch 10 to open the shutter, and after waiting a given time interval, operate switch 10 to close the shutter. Or, some external timing mechanism could operate switch 10 to the same effect.

Monostable operation, however, is also provided in the present invention for closing the shutter automatically after a predetermined interval of time. As shown, SCR 13 is arranged to be fired by a voltage breakdown device, for example, neon lamp 32. Neon lamp 32 has one electrode connected via a switch 33, a resistance 34, and a resistor 35, to anode voltage between resistor 14 and the anode of SCR 13. Said one electrode is also connected by a capacitor 36 to ground, and the other electrode of the lamp is connected to ground via a resistor 37. The junction of resistors 34 and 35 is connected to cathode of a zener diode 38, the anode of which is connected to ground.

The purpose of zener diode 38 is to stabilize a charging voltage for capacitor 36, which stems ultimately from the diode 15. The resistor 34 and the capacitor 36 provide for setting the exposure time, as by varying the value of one or the other or both. As shown, resistor 34 is variable, so consider it to be set at a value such that the time it takes capacitor 36 to charge to a voltage that will fire the neon lamp 32 corresponds to the desired exposure time.

It will be plain now that once the switch 10 is pressed to fire SCR 3, capacitor 36 will begin to charge at a rate determined by its value and that to which resistor 34 is set. After a correspondingly predetermined length of time the voltage on capacitor 36 will cause a discharge between the lamp electrodes, thereby connecting the gate of SCR 13 to the voltage on the capacitor. As a result, SCR 13 fires and SCR 3 turns off, thus closing the shutter.

It will be noted that switch 33, as shown, can break the connection of the resistor 34 to the capacitor 36, and instead connect a resistor 40 across the capacitor 36. Breaking this connection disconnects the capacitor from the charging voltage, and thereby provides for bistable operation of the circuit, that is to say, provides the previously described mode of shutter operation wherein switch 10 must be used to close the shutter, as well as to open it.

In the monostable operation, a diode 41 drains residual charge from capacitor 36 when SCR 13 is on. That is, when SCR 13 is on, it connects the cathode of diode 41 to ground, and therefore the side of capacitor 36 connected to the anode of diode 41 is also connected to ground. As a result, whenever SCR 3 is fired to start an exposure, the voltage on capacitor 36 always builds up from the same starting value, substantially ground. (Similarly, zener diode 38 assures that the charging voltage remains substantially constant.) However, if the bistable mode is selected by operating switch 33 to disconnect resistor 34, then back-leakage of current through the diode 41 can charge up capacitor 36 while SCR 13 is off. As SCR 13 is off when SCR 3 is on, perhaps intended to be on to provide a relatively long exposure time, the capacitor 36 could charge through diode 41, enough to fire SCR 13 prematurely. Accordingly, whenever switch 33 is actuated to break the connection to resistor 34, it also makes the connection to resistor 40, which latter then maintains capacitor 36 discharged, in spite of back-leakage through diode 41, thereby preventing premature shutter-closing while the bistable mode of operation is being used.

Resistor 37 corresponds to resistors 29 and 30 in setting the level of the pulse actually applied by the discharging lamp 32 to the gate of SCR 13.

Resistor 34, in practice, will be a bank of fixed resistors, selectable singly, or in various combination, by a switch like switch 33 but having more positions. The fixed resistor values would be selected by trial to give the appropriate corresponding exposure times. Once the resistors are selected, experience with the present invention shows that exposure time corresponding to a given resistor setting remains fixed within allowable tolerances, indefinitely.

The circuit elements are not critical and in fact it is to be expected that the mechanical action of the shutter mechanism will deteriorate before electrical operation does. The main precaution to be taken is to protect the SCR's, as by means of diodes 42 and 43, against excessively large negative gate voltages.

It will be noted that the system uses three distinct voltage supplies. Two of these are represented by diodes 7 and 15, with capacitors 4 and 49, respectively, the former supply providing a voltage which is deliberately deregulated in order to provide for the special needs of shutter operation, and for operator safety, and the latter supplying a voltage that is, in contrast, well-regulated(by diode 38), in order to provide consistent timing accuracy. The third supply is represented by diode 11, which supplies gate voltage for the SCR's.

The third supply is not functionally necessary, and could be provided by diode 15, doing double duty. However, in practice, the DC voltage out of diode 15 is on the order of 150 volts. Since the system is to be used by human beings who will come into contact with various parts thereof, such as switch 10, and/or a switch 44 provided at a distance from the box or panel housing the system and connected thereto by exposed wiring. Accordingly, it is preferred to provide the third diode 11, connected to a tap, on winding 8, such as will provide a voltage pulse on the order of 30 volts or less, simply as a safety precaution.

Naturally, batteries, separate transformers, etc., can be used to supply the necessary voltages. However, it is to be noted that the use of A.C. allows the use of half-wave rectification which cuts power consumption to half that which continuous or full-wave rectified D.C. would provide.

The use of SCR's is an important feature of the invention. Transistor multivibrators are known, of course, but these are essentially impractical, especially since line voltage is relatively high, e.g., 110–220 V.A.C., and insofar as simplicity of design and construction, and reliability are concerned. SCR's combine ruggedness, sensitivity and a power handling capacity far more than adequate for the purposes of the present invention.

Figure 2:
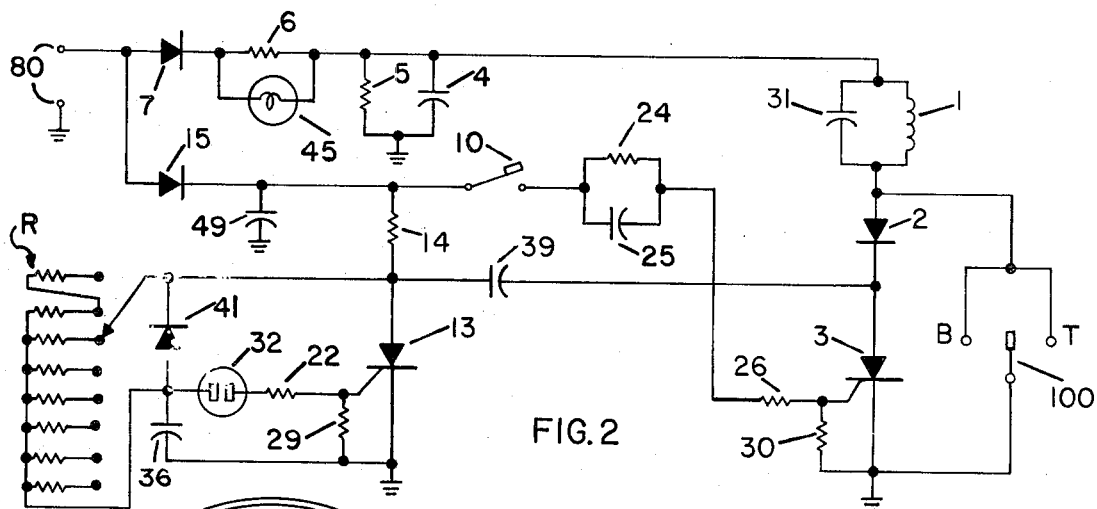
FIG. 2 is a modified form of the invention shown in FIG. 1.

The form of the invention shown in FIG. 2 represents both a simplification and a modification of the system of FIG. 1. Insofar as practicable corresponding elements have been given the same reference numerals used in FIG. 1.

The main functional difference is that only the monostable multivibrator mode is used. Instead of the bistable mode, a combined momentary-contact and sustained-contact switch bypasses SCR 3, for what corresponds to the "Bulb" and "Time" exposure settings of purely mechanical shutters. Thus, throwing switch 100 to the position indicated as B in FIG. 2, opens the shutter and holds it open as long as the switch is held in that position by hand. In that position, the shutter coil is connected directly across the half-wave rectified AC source, 110 volt house current at terminals 80, say. If the switch is released, it opens, ending the exposure.

The switch can also be hand operated to the illustrated T position. In this case, the switch stays at T, even though the hand is taken from it. To end the exposure, the switch is moved back by hand to open position, midway between the B and T contacts.

The system of FIG. 2 uses but two power supplies, represented by diodes 7 and 15. The supply for coil 1 is deregulated by an ordinary filament-type low voltage bulb 45, in parallel with resistor 6, which provides a "shutter-open" indication. Also, when switch 10 is closed, the cold resistance of the bulb in parallel with resistor 6 allows a relatively heavy surge of current to get to coil 1. However, this current heats the filament, thereby increasing its resistance and cutting down the voltage on the coil.

The simplifications involved in FIG. 2, as compared to FIG. 1, are many. Capacitor 21 is eliminated, since the bistable mode is not used. That is, switch 10 is never used to turn SCR 13 on. The negative gate voltage limiting diodes 42 and 43 have been omitted, as has the so-called safety circuit: resistors 16 and 17, and diode 18. In the timing circuit, shown as a bank of resistors R, such as discussed in connection with resistance 34, FIG. 1, there is no counterpart of resistor 40, again because the bistable mode is not used. That is, back leakage of diode 41 cannot possibly affect exposure when this is being controlled by switch 100. Diodes 27,28, 19 and 23 are eliminated, again because the bistable mode is not used. That is, switch 10 never pulses but the one gate, that of SCR 3, and the gate circuits of the SCR's are inherently isolated from each other.

Those skilled in the art will be able to choose parts of suitable value for the circuits of FIGS. 1 and 2 without exersize of invention. However, actual parts values may be chosen, as follows in the case of FIG. 1:

In the deregulated power supply for coil 1, resistors 5 and 6 may be 1K and 4K ohms, respectively, and capacitor 4 may be 30 microfarads.

In the safety circuit, resistors 16 and 17 may each be 270K. At the same time, capacitor 39 may be 0.22 microfarad, and diode 18, a 1 ampere, 200 p.i.v. silicon diode.

SCR's 3 and 13 may each be a General Electric C106B2.

In the circuit of SCR 3, capacitors 31 and 25 may be 0.1 and 0.001 microfarad, respectively; resistors 24, 26 and 30, 1 megohm, and 3.3K and 220 ohms, respectively. Diode 43 may be a germanium diode of relatively low current, low p.i.v. rating. In the circuit of SCR 13, resistors 20, 14, 22, and 29 may be 1 megohm, and 15K, 22K and 5.6K, ohms, respectively. Capacitor 21 may be 0.00047 microfarad. Diode 42 may be similar to diode 43.

In the timing circuit, capacitor 36 may be 0.1 microfarad. Resistors 35, 37 and 40 may be 22K, 5.6K and 820K ohms, respectively. The range of variation of resistance 34, of course, is to be chosen to give a range of time constants, in conjunction with the value given for capacitor 36, as will provide the range of exposure times it is desired to have available. Neon bulb 32 is chosen to have a firing current sufficient to fire SCR 3, and zener diode is chosen to suit.

The peak voltages available at the cathodes of diodes 11 and 15 may be 27 and 160 volts respectively.

The values of resistors 5 and 6 specified provide for deregulating the voltage at the junction of these resistors from 160 volts peak to 21 volts, since solenoids for use as coil 1, under such conditions, are readily available commercially, e.g., solenoid actuator PO–37, manufactured by Electromechanisms, Inc., Monrovia, California. The winding of this device has a continuous duty rating of 48 volts at 4 watts.

The above is in fact an account of the details of the circuit of FIG. 1, as actually reduced to practice, and is not to be taken as limiting the invention as claimed.

The circuits of FIGS. 1 and 2 are intended both to provide shutter operation and timing with a minimum of mechanical structure, to be usable with available shutter mechanisms, such as the conventional iris.

FIG. 2 illustrates the essence of a shutter system incorporating the circuitry of FIG. 1 or FIG. 2, in combination with shutter mechanism M. Mechanism M includes the usual lens ring structure 50 which mounts an iris-type shutter, comprising a number of overlapping leaves generally indicated by the reference numeral 51. As shown, the shutter is closed, and a lever 52 is provided which if deflected upwards as shown in the Figure, causes suitable linkage (not shown, but quite conventional) to swing the leaves 51 away from the circular aperture defined by the lens ring structure 51.

The shutter structure, as thus far described, is well known, but unlike the usual shutter mechanism, the lever 52 is arranged to be operated by a simple first class lever 53, and coil 1. The lever 53 is pivoted at 54 to the element 48 (a plate, or the like, providing for mounting the shutter mechanism as a whole)for deflection in the plane of the Figure, about pivot 54. Lever 52 is shown as having a sort of ear or lug 55 projecting through an aperture in the end of link 56, link 56 being pivoted at 57 to one end of lever 53. A spring 58 interconnects lug 55 and a fixed element 59 on mounting element 48. In the position shown, the spring 58 is under tension, urging the lever downward, thereby biasing the leaves 51 into the positions shown.

The other end of lever 53 is pivoted at 60 to the movable core 61 extending downwardly into the coil 1, which is in the form of a solenoid. As will be evident from the preceding description of FIGS. 1 and 2, if the coil 1 is energized, core 61 will be drawn further into coil 1, thereby deflecting lever 53 clockwise about pivot 54, against the bias of spring 58. When, thereafter the coil 1 is deenergized, the spring 58 will pull the lever 53 back to the position shown. In the course of these deflections, lever 52 will be moved up, then down, which therefore respectively opens and closes the iris.

It will be noted that by incorporating the timing function in the circuitry represented by box 62, rather than in delicate and complex mechanism that has to find place within the confines of mounting element 48, great simplicity and ruggedness is in effect built into the shutter mechanism. The force for opening the iris is obtained by solenoid action, which at the same time stores up spring force for closing the shutter upon deenergization of the solenoid. Since these forces can be very powerful, the linkage for deflecting lever 52 can be as simple and rugged as the conformation of and space available in the mounting element permit. As shown, the mechanism M is a substantially 1:1 plan view of a typical shutter mechanism.

Figure 3:
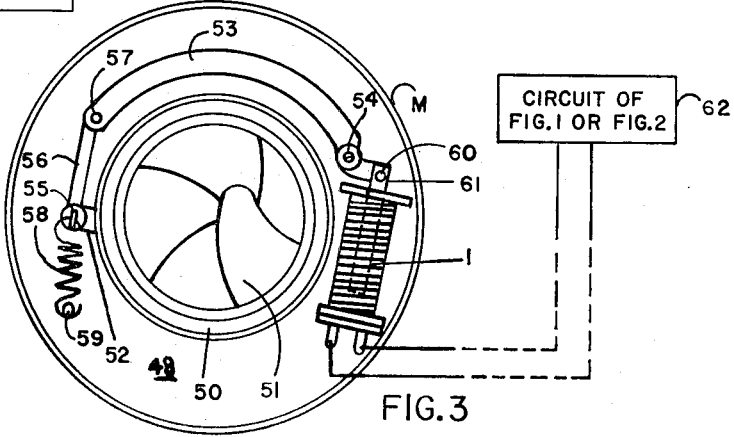
FIG. 3 illustrates the aforesaid system together with suitable shutter mechanism.

In compliance with the statutes, I have set forth my invention in such fashion as will enable one skilled in the art to routinely make and use it in the best mode known to me thus far. However, various modifications may be made therein without exercising inventive skill and without departing from the scope of the claims appended hereto. For example, the neon lamp 32 could be replaced by a unijunction transistor, a zener diode, or other voltage breakdown devices. Further, as illustrated in detail by the system of FIG. 2, various elements may be omitted without modifying the basic scheme of providing electrical exposure-time control according to the several modes practiced in photography and related arts. Again, various refinements may be made therein, such as, for example, providing photosensitive resistance or equivalent means in the charging circuit of capacitor 36, whereby to modify exposure timing in accordance with variation in illumination during exposure. Shutter mechanisms of form other than shown in FIG. 3 may also be used with the circuitry of FIGS. 1 and 2, and various modifications of the structure shown may be made. For instance, other types of springs for biasing levers 52 and/or 53 may be used with or instead of spring 58, and various forms of linkage may be used to connect core 61 to lever 52.

I claim:

1. An electrically-operated, photographic shutter system, said system including a motor having a winding for opening said shutter in response to current flowing through said winding, and for maintaining said shutter open as long as said current flows, and there being means for closing said shutter when said current ceases flowing, and for maintaining said shutter closed as long as said current is not flowing;

said system including a first circuit for said current, said first circuit including a first SCR and said winding, there being means for connecting voltage across said first circuit for causing said current to flow through said first SCR's anode-cathode path when said first SCR is conducting, said winding being connected in series with said path for having said current flow through said winding;

said system including a second circuit for current, said second circuit including a second SCR, there being means for connecting voltage across said second circuit for causing current to flow through said second SCR's anode-cathode path when said second SCR is conducting;

one of said gates having first firing pulse producing means actuable by application of voltage thereto for applying a firing pulse to said one of said gates, and the other of said gates having second firing pulse producing means actuable by application of voltage thereto for applying a firing pulse to said other of said gates;

switch means connected to each said firing pulse producing means for applying voltage to both thereof simultaneously, and means connected to each said firing pulse producing means and responsive to firing of either said SCR for preventing the corresponding firing pulse producing means from producing a firing pulse when said switch means applies voltage thereto; said system including a commutating capacitor interconnecting the anodes of said SCR's, the cathodes of said SCR's being connected together for causing firing of said first SCR, in response to said firing pulse, for turning off the said second SCR, if the latter is firing and the former is not firing at the time the last-said firing pulse is produced.

2. The system of claim 1, including a safety circuit responsive to connection of voltage across said paths for turning said second SCR on.

3. The system of claim 2, wherein said safety circuit includes resistance interconnecting the anode and gate of said second SCR, and also a diode having its anode connected by said resistance to the anode of said second SCR and its cathode connected to the anode of said first SCR.

4. The system of claim 3, wherein said diode's anode is connected to an intermediate point of said resistance.

5. The system of claim 1, wherein said second circuit includes third firing pulse producing means connected to the gate of said second SCR and responsive to voltage across the anode-cathode path of said second SCR in non-conducting state to apply a firing pulse, said second firing pulse producing means including delay means for delaying production of the last said firing pulse for a predetermined time following any instant at which said first SCR begins conduction.

6. The system of claim 5, wherein said third firing pulse producing means is a discharge device, and said delay means is an RC circuit for applying the last said voltage to the gate of said second SCR, after a time interval determined by the RC time constant, said RC circuit being adjustable for varying the value of said time interval.

7. The system of claim 5, wherein said third firing pulse producing means includes a capacitor connected across the cathode-anode path of said second SCR, a discharge device connected between the gate of said second SCR and said capacitor, and there being variable resistance in series with said capacitor.

8. The system of claim 7, including a diode connected across said variable resistance, with its cathode connected to said anode of said second SCR, and its anode connected to said capacitor.

9. The system of claim 8, including a resistance and switch means for disconnecting said capacitor from said variable resistance and substantially simultaneously connecting said resistance across said capacitor.

10. The system of claim 1, wherein the first and second said firing pulse producing means are respectively connected to one said gate via a first resistor and a first capacitor in parallel with each other, and to the other said gate via a second capacitor and a second resistor in parallel with each other, each said capacitor being selected to have such value of capacitance as will limit a firing pulse to a duration both sufficient to fire the corresponding SCR, but less than the turn-off time of such SCR, and each said resistance being chosen to be both sufficiently large as not to fire the corresponding SCR and also to keep the corresponding capacitor in parallel therewith discharged between firing pulses produced by said first said firing pulse producing means.

11. The system of claim 1, wherein said firing pulse producing means is connected to the gate of said first SCR via a first diode and to the gate of said second SCR via a second diode, each said diode having its anode connected to a corresponding said firing pulse producing means, and its cathode connected to the gate of the corresponding said SCR, there being a third diode connected by its anode to the cathode of said first diode and by its cathode to the anode of the corresponding said SCR, and there being a fourth diode connected by its anode to the cathode of said second diode, and by its cathode to the anode of the corresponding said SCR.

12. The system of claim 11, wherein said safety circuit includes resistance interconnecting the anode and gate of said second SCR, and also a diode having its anode connected by said resistance to the anode of said second SCR and its cathode connected to the anode of said first SCR.

13. An electrically-operated, photographic shutter system, said system including a motor having a winding for opening said shutter in response to current flowing through said winding and for maintaining said shutter open as long as said current flows, and there being means for closing said shutter when said current ceases flowing, and for maintaining said shutter closed as long as said current is not flowing:

said system including a first circuit for said current, said first circuit including a first SCR and said winding, there being means for connecting voltage across said first circuit for causing said current to flow through said first SCR's anode-cathode path when said first SCR is conducting, said winding being connected in series with said path for having said current flow through said winding;

said system including a second circuit for current, said second circuit including a second SCR, there being means for connecting voltage across said second SCR's anode-cathode path when said second SCR is conducting;

firing pulse producing means connected to the gate of said first SCR for applying a firing pulse thereto;

said system including a commutating capacitor interconnecting the anodes of said SCR's, the cathodes of said SCR's being connected together for causing firing of said first SCR in response to a said firing pulse applied to said first SCR's gate when said second SCR is firing, and for then turning off said second SCR; and there being normally-open switch means interconnecting the anode and cathode of said first SCR.

14. The system of claim 13, wherein said second circuit includes second firing pulse producing means connected to the gate of said second SCR and responsive to voltage across the anode-cathode path of said second SCR in non-conducting state to apply a firing pulse to the gate of said second SCR, said second firing pulse producing means including delay means for delaying production of the last said firing pulse for a predetermined time following any instant at which said first SCR begins conduction.

15. An electrically-operated shutter system, said system including a multivibrator having first and second current paths; said multivibrator comprising means operable to initiate first current flow in said first path, circuitry interconnected with said current paths for causing second current flow in said second path in response to current flow in said first path and for causing said first current flow to cease upon said second flow beginning and said circuitry including timing means, said timing means being adjustable for determining length of time required for such response to occur;

said system further including the winding of the motor of a normally closed shutter of the type wherein said shutter opens in response to current flowing through said winding but closes in response to cessation of current through said winding, said winding forming part of said first current path, and maintaining said shutter open as long as said current flows through said winding; said circuitry including means operable to prevent said timing means from determining the length of time required for said response to occur, and for causing said response to occur independently of said circuitry, and at a time independent of time of initiation of the first said current flow.

16. An electrically-operated shutter system, said system including a multivibrator having first and second current paths; said multivibrator comprising means operable to initiate first current flow in said first path, circuitry interconnected with said current paths for causing second current flow in said second path in response to current flow in said first path and for causing said first current flow to cease upon said second flow beginning and said circuitry including timing means, said timing means being adjustable for determining length of time required for such response to occur;

said system further including the winding of the motor of a normally closed shutter of the type wherein said shutter opens in response to current flowing through said winding but closes in response to cessation of current through said winding, said winding forming part of said first current path, and maintaining said shutter open as long as said current flows through said winding;

said system including means defining a third current path having a part independent of the other said paths, but including said winding as part thereof, and said part including normally open switch means preventing current flow through said path, said switch means being closable for predetermined lengths of time independent of said delay means.

17. An electrically-operated shutter system, said system including a multivibrator having first and second current paths; said multivibrator comprising means operable to initiate first current flow in said first path, circuitry interconnected with said current paths for causing second current flow in said second path in response to current flow in said first path and for causing said first current flow to cease upon said second flow beginning and said circuitry including timing means, said timing means being adjustable for determining length of time required for such response to occur;

said system further including the winding of the motor of a normally closed shutter of the type wherein said shutter opens in response to current flowing through said winding but closes in response to cessation of current through said winding, said winding forming part of said first current path, and maintaining said shutter open as long as said current flows through said winding;

said system including first power supply means connected to said first current path for causing said first current flow therein; said first power supply means including deregulating means for causing said first current to flow at a voltage across said winding, which decreases from an initial high value at the beginning of said first current flow, while said shutter is opening, to a lesser value which, after said shutter is open, is substantially just sufficient to maintain said shutter open;

said system also including second power supply means connected to said first current path for causing said second current flow therein, and said second power supply means being independent of said first power supply means.

* * * * *